United States Patent [19]

Preller

[11] 4,377,732

[45] Mar. 22, 1983

[54] METHOD OF AND APPARATUS FOR THE PRODUCTION OF PROFILE MEMBERS AND HOLLOW BODIES FROM A PLURALITY OF METAL STRIPS OF CONSTANT THICKNESS

[75] Inventor: Hans Preller, Cologne, Fed. Rep. of Germany

[73] Assignee: Theodor Wuppermann GmbH, Leverkusen, Fed. Rep. of Germany

[21] Appl. No.: 247,472

[22] Filed: Mar. 25, 1981

Related U.S. Application Data

[63] Continuation of Ser. No. 24,833, Mar. 28, 1979, abandoned.

[30] Foreign Application Priority Data

Mar. 30, 1978 [DE] Fed. Rep. of Germany ....... 2813635

[51] Int. Cl.³ ............................................. B23K 13/02
[52] U.S. Cl. .................................. 219/10.43; 219/9.5; 219/10.73; 228/155; 228/158; 228/5.1
[58] Field of Search .................. 228/155, 158, 173 A, 228/173 B, 173 C, 173 D, 243, 265, 235, 205, 219, 4.1, 5.1, 6 R, 17; 219/78.16, 128, 9.5, 7.5, 10.43, 10.73, 10.69, 10.67

[56] References Cited

U.S. PATENT DOCUMENTS

| | | | |
|---|---|---|---|
| 1,000,967 | 8/1911 | Farquhar | 219/128 |
| 1,529,445 | 3/1925 | Miller | 228/158 |
| 2,414,511 | 1/1947 | Dyar | 228/5.1 |
| 2,539,247 | 1/1951 | Hensel | 228/205 |
| 2,722,735 | 11/1955 | Beamish | 228/5.1 |
| 2,762,892 | 9/1956 | Park | 219/10.43 |
| 2,767,467 | 10/1956 | Siegel | 228/205 |
| 2,827,809 | 3/1958 | Beam | 228/4.1 |
| 2,860,409 | 11/1958 | Boessenkool et al. | 228/205 |
| 3,071,855 | 1/1963 | Mineah | 228/158 |
| 3,359,402 | 12/1967 | Rieppel | 219/78.16 |
| 3,362,056 | 1/1968 | Preller | 228/173 D |
| 3,410,982 | 11/1968 | Morris et al. | 219/78.16 |
| 3,413,437 | 11/1968 | Hamamoto et al. | 228/158 |
| 3,713,205 | 1/1973 | Wogerbauer | 228/158 |
| 3,783,498 | 1/1974 | Moyer et al. | 228/158 |
| 3,787,656 | 1/1974 | Matsumoto | 219/107 |

FOREIGN PATENT DOCUMENTS

| | | | |
|---|---|---|---|
| 536709 | 9/1955 | Belgium | 219/9.5 |
| 970422 | 9/1958 | Fed. Rep. of Germany | 228/173 F |
| 1085980 | 7/1960 | Fed. Rep. of Germany | |
| 1097391 | 1/1961 | Fed. Rep. of Germany | 228/158 |
| 1452500 | 3/1969 | Fed. Rep. of Germany | 228/158 |
| 266157 | 4/1950 | Switzerland | 228/158 |
| 603533 | 4/1978 | U.S.S.R. | 228/265 |

*Primary Examiner*—Daniel C. Crane
*Attorney, Agent, or Firm*—John C. Smith, Jr.

[57] ABSTRACT

A method and apparatus for manufacturing metal profile members, hollow bodies and the like wherein a plurality of continuous band-like metal strips of constant wall thickness as viewed in cross-section are continuously fed along separate paths which converge. The band-like metal strips are heated at predetermined selected areas to a welding temperature and then continuously press-welded together to form the profile members. One or more of the band-like metal strips may be deformed by cold-shaping prior to the press-welding operation. Hot-shaping may occur simultaneously with or immediately after the press-welding operation. Also, cold-shaping of the welded material may take place following the press-welding and hot-shaping steps to form a metal profile member of predetermined configuration.

35 Claims, 38 Drawing Figures

METHOD OF AND APPARATUS FOR THE PRODUCTION OF PROFILE MEMBERS AND HOLLOW BODIES FROM A PLURALITY OF METAL STRIPS OF CONSTANT THICKNESS

This is a continuation of application Ser. No. 24,833 filed Mar. 28, 1979, now abandoned.

CROSS-REFERENCE TO RELATED APPLICATION

My application Ser. No. 24,833, filed Mar. 28, 1979 and entitled "METHOD OF AND APPARATUS FOR THE MANUFACTURE OF METAL PROFILE MEMBERS, ESPECIALLY STEEL PROFILE MEMBERS" is incorporated by reference in its entirety.

BACKGROUND OF THE INVENTION

This invention relates to a method of and apparatus for the continuous production of profile members, hollow bodies, etc., from a plurality of metal strips, especially steel strips or bands, which are of constant thickness and are of straight and/or profiled cross-section, by heating selected areas of the metal strips and joining the strips or bands by press-welding the related areas together.

Tubes of constant wall thickness have been produced from a continuous band which is heated to a temperature of about 1250° to 1300° C., is shaped between rotating rollers, is connected by pressing together the opposite edges of the band and is then grooved while in a heated state to its final diameter. According to German DE-PS No. 1,452,500 the method of producing thin-walled tubes by means of press-welding may be further improved if, in addition to the application of oxygen to the band edges, the band edges are locally heated by high-frequency induction heating.

German DE-PS No. 970,422 discloses the practice of forming closed and open profile members from two or more parts, either preformed or of straight profile, by butt-welding the edges to be connected. German DE-AS No. 1,097,391 discloses a method for the continuous production of profile members from a plurality of part-profile members. The individual part-profile members are first formed after which one of the part-profile members is twisted into position such that the free edges of all of the part-profile members are properly located with respect to each other for the formation of the hollow profile member by subsequent butt-welding of the free edges.

German DE-AS No. 1,085,980 discloses the conductive welding of the edges of a profile strip with a band-like surface portion of a workpiece having an extended upper surface. Separate parts are brought together in a continuous operation and are welded to form the desired profile member, the cross-section, i.e., thickness, of the walls of the finished product remaining unaltered, i.e., constant. Irregularities produced by welding are removed by further operations, such as a grooving process to bring thickened portions to their initial thickness.

SUMMARY OF THE INVENTION

An object of the present invention is a method and apparatus for the production of profile members, hollow bodies and the like from a plurality of metal strips of uniform or constant thickness, the profile members, hollow bodies and the like having a cross-sectional wall thickness and/or configuration at predetermined points which is different than the thickness of the metal strips.

In accordance with the invention, predetermined areas of two or more band-like strips of constant thickness are heated and brought together such that the heated areas overlap and are press-welded to form profile members, hollow bodies and the like, which have locally enlarged or thickened cross-sectional areas. The strips may be of the same thickness or of different thicknesses or even of varying qualities of material. Optionally, in the process of uniting the band-like strips of constant thickness, the area having an enlarged cross-sectional thickness may be altered by direct hot-shaping which is undertaken during the continuous production of the profile member, hollow bodies, etc. Furthermore, the profile members may be subjected to a cold-shaping procedure either before or after the press-welding and/or hot-shaping steps in the continuous production system.

By means of the method in accordance with the invention it is possible in a simple manner to produce multi-shaped profile forms for many different applications. It is possible to produce profile members in accordance with the invention which have excellent static qualities and which cannot be produced for either technical or economic reasons by methods known prior to this invention. It is possible, for example, to produce profile members with substantially varying dimensions or thicknesses and with complicated material undercuts which is not possible with hot-rolling or extrusion techniques. It is possible to obtain economically profile members with definite variations in wall thickness and with acute inner and outer radii.

More specifically, in accordance with the method and apparatus of the invention, separate band-like parts which are dimensioned depending upon the profile member to be formed and the requirements and conditions of the manufacturing process are heated in strip-like part areas, possibly following a cold-profiling operation, to a welding temperature of around 1250°-1300° C., are brought together and press-welded which may at the same time involve a hot-shaping effect and are then finally formed to the required shape. A wide variety of combinations may be obtained by the selection of appropriate metal strips or band-like parts and the utilization of appropriate shaping procedures.

The band-like parts or metal strips may be brought together either with their flat surfaces in contiguous relationship or at a definite acute angle with respect to each other in horizontal or vertical planes followed by unilateral press-welding. They can also be joined together by unilateral overlapping in the same plane. Furthermore, it is possible to join the marginal zone of one strip with a zone intermediate the opposite edges of another strip. To produce hollow bodies it is possible to join together predetermined zones of several strips arranged one above the other or one against the other.

It is often desirable during the assembly and shaping process if the strips either before or after being joined together are twisted into another plane. Such a twisting operation may be carried out at the same time the strips are brought together for press-welding and hot-shaping.

The heating system may include heat sources such as burner tracks, resistance heating with roll-transformers, conduction heating with high-frequency current sources, etc. However, since the method of the invention requires a concentrated, speedy and economically optimum heating effect, medium-frequency induction heating has proven to be particularly suitable. The heating of the areas remote from the edge of the band may be affected by linear inductors, the linear inductors being arranged both above and below the moving band in cases where the material of the moving band is of substantial thickness. Heating of the edges of the band may be effected by tunnel inductors which embrace the edges of the bank, providing a greater heat efficiency than the linear inductors. Depending upon the thickness of the band, the width to be heated and the electrical capacity of the installation, heating speeds may be achieved which lie conveniently within the operating speeds common for roll-profiling and tube-welding plants.

DESCRIPTION OF THE PREFERRED EMBODIMENT

Figure 1:
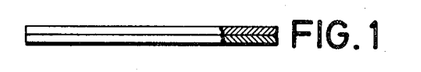
FIGS. 1 to 6 show symbolically a selection of the various possible combinations of metal strips in predetermined positions relative to each other, the heated zones (shaded portions) of said strips being press-welded.
Figure 2:
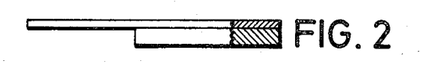
Figure 3:
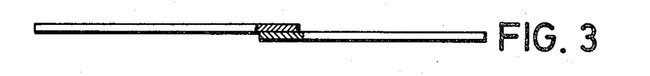

In FIGS. 1-6 a number of possible combinations of press-welded metal strips are shown. In FIG. 1 the components which are of the same breadth and thickness are placed one above the other and are welded together in the vicinity of one edge. The components in FIG. 2 have different breadths and thicknesses. In FIG. 3 the components are offset, one component being welded in the vicinity of one edge to the other component in the vicinity of one edge, the two edge vicinities overlapping.

Figure 4:
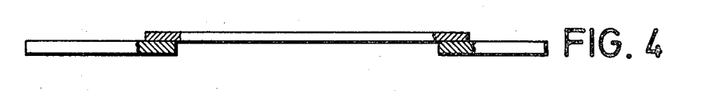
Figure 5:
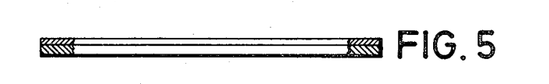

In FIG. 4 three components are welded together, the central component being welded in the vicinity of its opposite edges to the end components in the vicinity of their respective edges, the edges overlapping. These components may have different breadths and thicknesses and may be arranged side-by-side offset. In FIG. 5 the components are welded together in the vicinities of their opposite edges while in FIG. 6 they are welded additionally in an area intermediate their opposite edges. Not only may the components have different dimensions but the composition of the components may differ provided, of course, the compositions are suitable for welding.

Apart from the positions shown, the components may also be joined together vertically or in any other desired relative angular position. The most suitable positions of the components relative to each other at the moment of welding is governed essentially by the required deformation conditions.

For the sake of simplicity, in FIGS. 7-11 the various possible combinations of hot-shaping in the vicinity of the press-welding and occurring at the same time as this welding, are shown with reference only to the arrangement shown in FIG. 1. It will be understood that these examples as well as the other examples which follow are concerned only with a limited selection of possible shapes or configurations.

Figure 7:
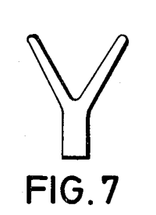
FIGS. 7 to 11 show profile members which illustrate possible configurations resulting from hot-shaping of the metal strips brought together by unilateral press-welding as shown in FIG. 1.
Figure 8:
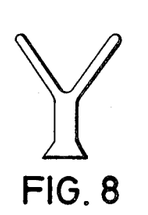
Figure 9:
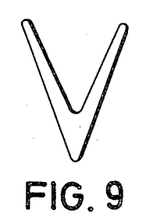
Figure 10:
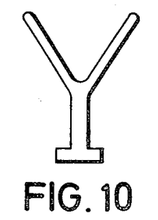
Figure 11:
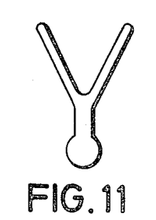
Figure 12:
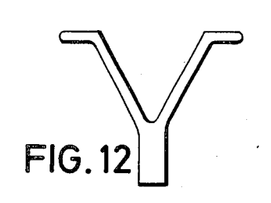
FIGS. 12 to 14 show examples of completed cold-shaped cross-sections which may be produced from the press-welded configuration of FIG. 7.
Figure 13:
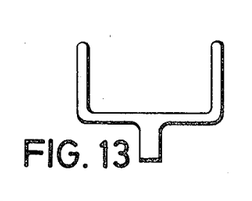
Figure 14:
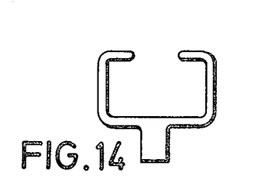

In FIGS. 12-14 the possible shapes or configurations formed during the subsequent cold-shaping are shown only with reference to the profile member illustrated in FIG. 7.

Figure 15:
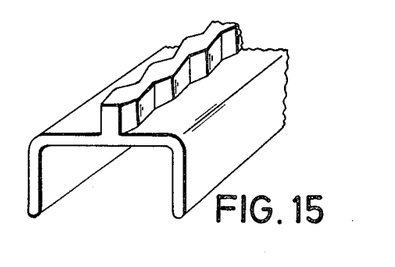
FIGS. 15 and 16 illustrate U-shaped profile members produced from the cross-sectional shape of FIG. 13 wherein a particular profile has been imparted to the bead, this latter profile being along planes at right angles to the lengths of the profile members.
Figure 16:
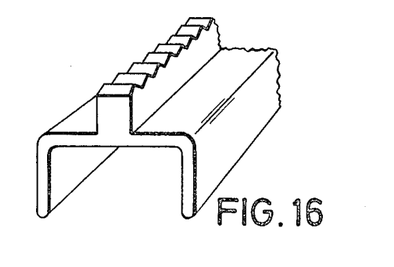

In FIGS. 15 and 16 U-shaped profile members are shown, the profile members having been produced from the cross-sectional shape of FIG. 13, wherein deformations at a right angle to the direction of feed of the profile member which may be effected by hot-shaping are illustrated.

Figure 17:
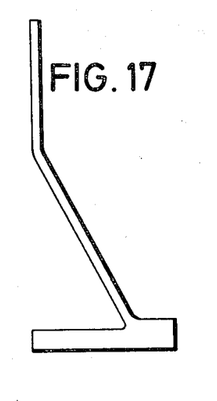
FIGS. 17 to 19 show examples of cross-sections which may be produced from the combination of oven-welded strips illustrated in FIG. 2.
Figure 18:
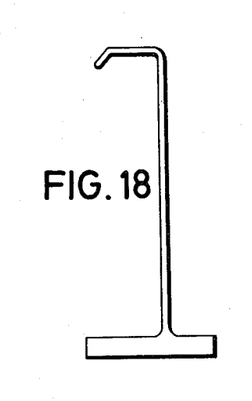
Figure 19:
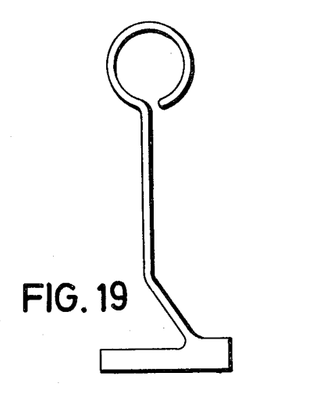
Figure 20:
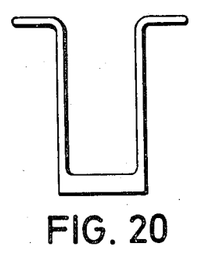
FIGS. 20 to 22 show examples of cross-sections which may be produced from the combination of press-welded strips illustrated in FIG. 3.
Figure 21:
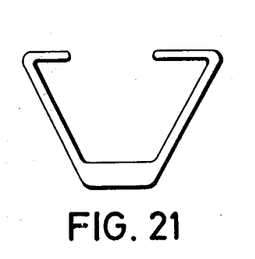
Figure 22:
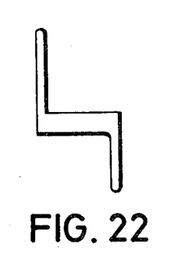

In FIGS. 17-19 special profile members are shown which are produced from components arranged as shown in FIG. 2. These are profile members which have a thicker base. It is possible to confer additionally some other configuration to this base by hot-shaping. This also applies to the profile members of FIGS. 20-22 which have thicker intermediate portions and which are produced mainly from components as shown in FIG. 3.

Figure 23:
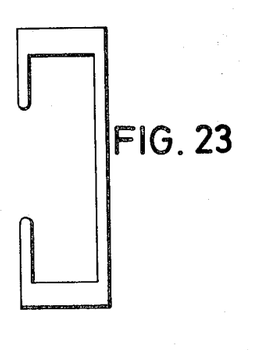
FIGS. 23 to 25 show examples of cross-sections which may be produced from the combination of press-welded strips illustrated in FIG. 4.
Figures 24, 25:
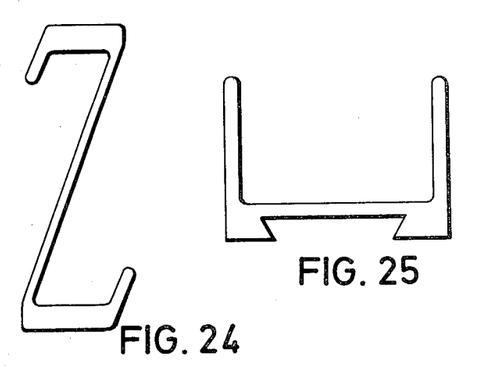

Due to the thicker portions produced by stamping towards the extremities, the cross-sections shown in FIGS. 23 and 24 possess favorable static qualities. FIG. 25 shows a U-shaped profile member of dove-tail cross-section obtained by hot-shaping. The profile members of FIGS. 23–25 are preferably produced from components consisting of three strips welded together as illustrated in FIG. 4.

Figure 6:
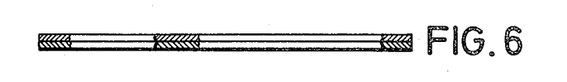
Figure 26:
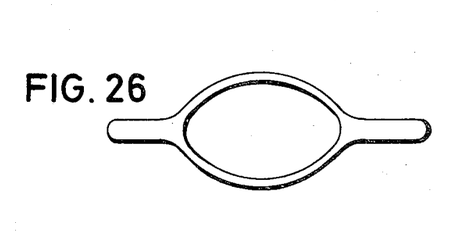
FIG. 26 shows in cross-section a thin-walled tubular fin.
Figure 27:
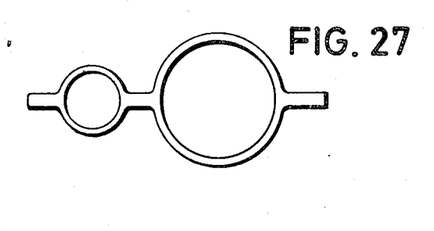
FIG. 27 shows in cross-section a two-chamber hollow body produced according to the invention.

FIGS. 26 and 27 illustrate hollow bodies which may be produced from the components illustrated in FIGS. 5 and 6. The material here is basically thin strip material which is simply joined together by press-welding and which may, in certain cases, also be hot-shaped in the area of the press-weld. These are cut into convenient lengths during continuous operation, whereas in the case of the double strips which are required to undergo a further cold-rolling or heat treatment these are wound into coils. The shaping of these strip materials which are under approximately 1 mm thick to form hollow bodies is carried out in a separate work operation preferably by expanding by means of pneumatic or hydraulic media.

Figure 28:
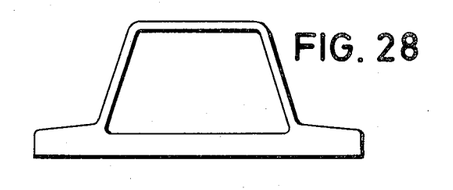
FIG. 28 shows in cross-section the configuration of a hollow profile member produced from the combination of an unformed strip and a preformed strip.
Figures 29, 30, 32, 33:
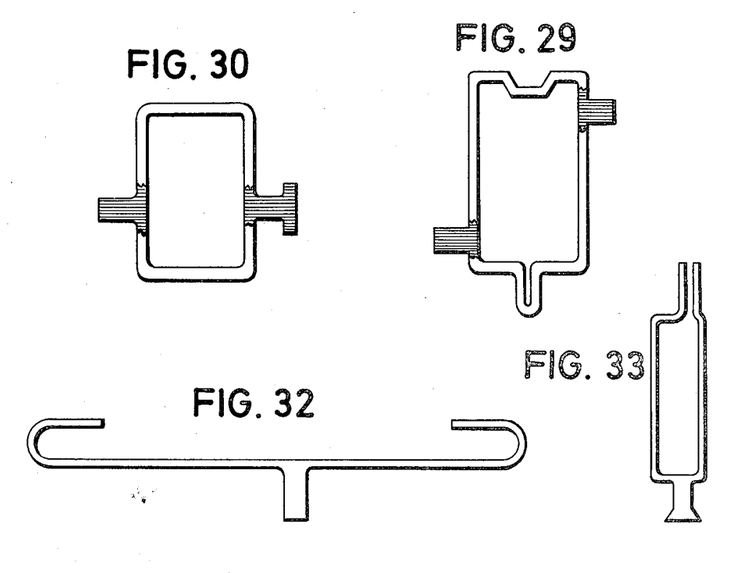
FIGS. 29 and 30 show cross-sectional views of press-welded hollow profile members produced according to the invention.
FIGS. 32 and 33 show cross-sections of open profile members produced from two preformed strips.

The hollow bodies illustrated in FIGS. 28–30 are produced from thicker materials. In FIG. 28, for example, only one strip component is cold-formed to a trapezoidal profile which is then welded to an unformed thicker component forming the base of the hollow profile member. In the case of FIGS. 29 and 30 the two halves, which are preformed either symmetrically or unsymmetrically, are joined together at the points shown by shading. These areas as will be seen from FIG. 30 are not only grooved to give a right-angled flange portion but may also be hot-shaped into more distinctive forms.

It will be appreciated that varied hollow profile members may be produced with one or more completely separate hollow areas, the hollow profile members being characterized essentially by weld connections located outside the hollow areas and/or further shaped connections.

Figure 31:
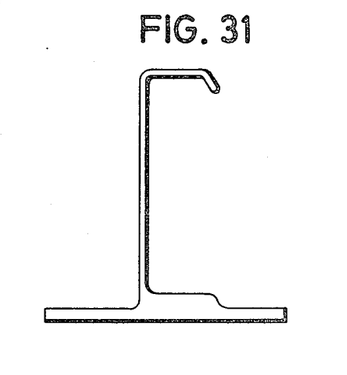
FIG. 31 shows in cross-section an open profile member assembled from the combination of an unformed strip and a preformed strip.

In FIG. 31 an example of an open profile member is shown which is produced by welding at least one cold preformed area of a strip component to a second unformed component at a point remote from the edge of the second component.

It may also be necessary to join together two or possibly even more than two cold preformed components whereupon these are simply cut into convenient lengths without further operations, in particular further cold-shaping operations. Such requirements arise basically from the geometry of the desired end cross-sections which may be too bulky for the subsequent end-profiling or too complicated. Examples of this are shown in FIGS. 32 and 33.

Figures 34, 35, 36:
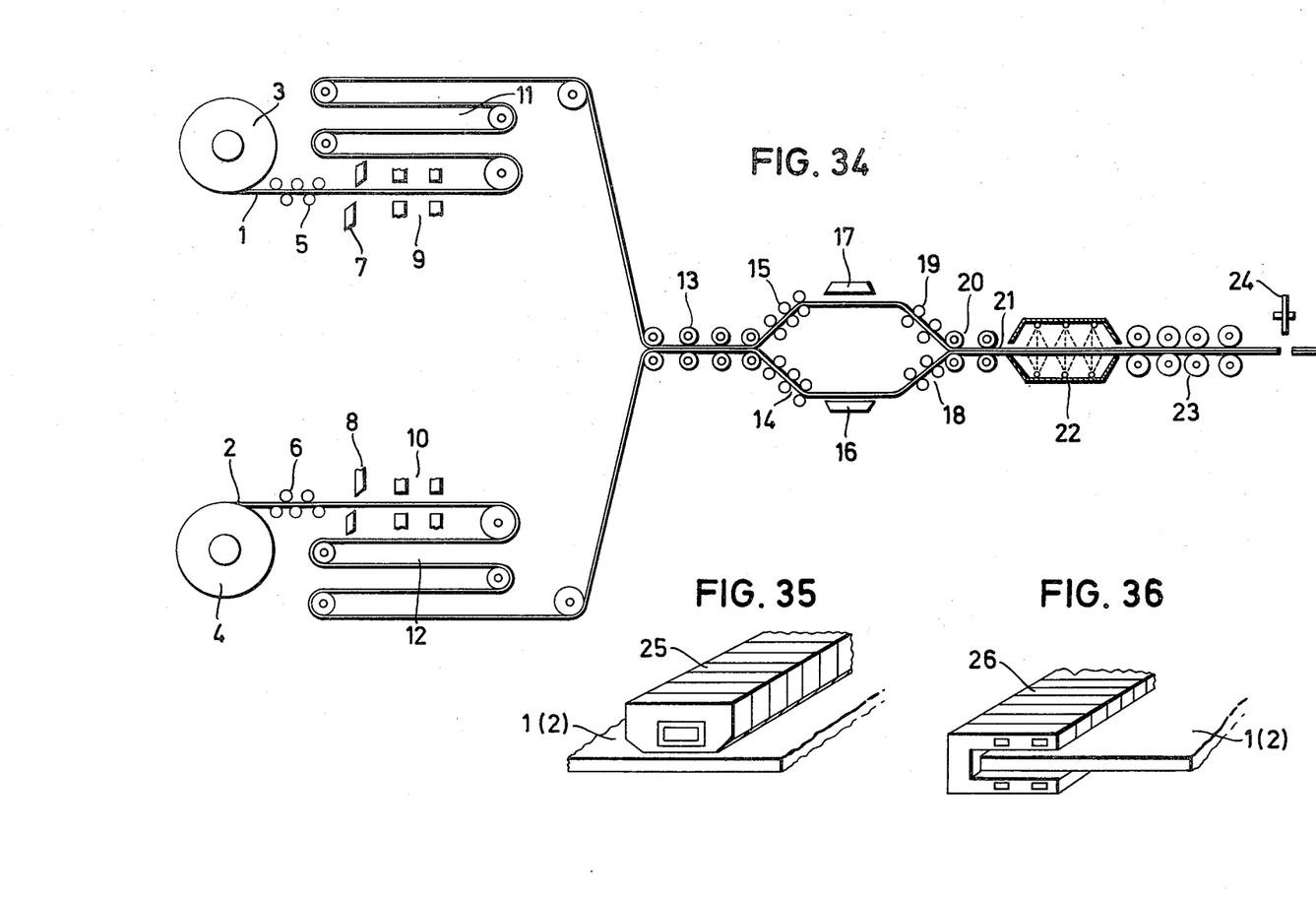
FIG. 34 shows diagrammatically one embodiment of the method and apparatus for performing a sequence of operations according to the invention.
FIG. 35 is a perspective view of a linear inductor arranged to heat the central area of a strip.
FIG. 36 is a perspective view of a tunnel inductor arranged to heat one edge of a strip.

A preferred method and apparatus for carrying out the invention is set forth diagrammatically in FIG. 34. Continuous bands or strip-like materials 1 and 2 are drawn from coils 3 and 4, each passing through a straightening machine 5, 6 and both a shearing machine 7, 8 and a welding device 9, 10 for joining the ends of bands or strip-like material of successive coils. The bands or strip-like material then pass through a band-storage apparatus 11, 12 shown here with the band material arranged in loops. The band storage devices are required to ensure that during the joining of the ends of the bands of successive coils the continuous supply of material to the welding hot-shaping operations is maintained uniform and not interrupted. The arrangement shown for each component strip as a separate band-treatment unit may be situated side-by-side, behind one another or above each other depending upon particular requirements and/or conditions.

From the band-treatment units the component strips 1 and 2 are fed into a common profile-rolling mill 13. In this mill the component strips may be cold-formed, preformed or fully formed. This may be carried out for both component strips 1 and 2 in the same shaping stands or in separate stands. It may be advantageous if the shaping stands of the profile rolling mill 13 are equipped with separate drive units having stepless control means to ensure absolutely smooth synchronized movement of the two component strips 1 and 2. If no cold-shaping is required before the joining process, the profile-rolling mill 13 may serve merely for guiding and transporting the strip material. It is immaterial whether each component strip is guided by a separate profile-rolling mill or, in the case where preforming is unnecessary, simply by pairs of drive rollers.

After passing through the profile-rolling mill 13, the component strips 1 and 2 are directed away from each other and are brought into positions for subsequent heat-treatment, hot-shaping and cold-deformation by means of the guide rollers 14 and 15 which are not driven. For heat treatment purposes, a medium-frequency induction system is preferably employed in which the inductors are designed, according to the particular position of the zone to be heated, either as a linear inductor 25 (FIG. 35) or as a tunnel inductor 26 for the band-edge zone (FIG. 36). Heating to welding temperature may be assisted by a supply of oxygen projected through jets upon the zones to be heated.

The component strips 1 and 2 are then brought together again by pairs of rollers 18 and 19 which are not driven and which, in certain circumstances, may carry out at the same time certain simple deformation operations. This is followed by the press-welding in conjunction with the hot-shaping in the grooves of the pairs of rollers 20. The rollers 20 which assume the form of shaping rollers are arranged horizontally, vertically, or in any desired angular position or even in the form of matrices. To improve the quality of the press-welds, which are in some instances relatively broad, it is recommended that the component strips 1 and 2 be shielded from the atmosphere which may cause deterioration. This may be accomplished by providing a zone of protective gas between the heating and press-welding operations.

Following the press-welding and hot-shaping, there is preferably means for controlled cooling to a predetermined residual heat of the now completed section 21, this being indicated in the diagrammatic sketch as a water-spray chamber 22. Other types of cooling means may be employed, however, as for example a water-bath or air flue.

The section 21 is then conveyed to a further profile-rolling mill 23 which together with the mill 13 is responsible by means of its powered rollers for ensuring that the conveyance of the strip material through the entire plant takes place in a smooth synchronized manner.

In the profile-rolling mill 23 the various stages of cold-deformation are carried out leading to the final form or cross-section. The cold-deformation should take place at a temperature above room temperature which has a favorable affect on the deformation while at the same time deformation stresses which occur in the course of normal cold-deformation are alleviated. If after press-welding and hot-shaping further cold-deformation is unnecessary, the profile-rolling mill 23 may serve merely for straightening and for profiling operations.

After the cold deformation and possibly also further cooling before straightening, the completed profile member is cut to predetermined lengths by means of a shearing device 24.

Figure 37A:
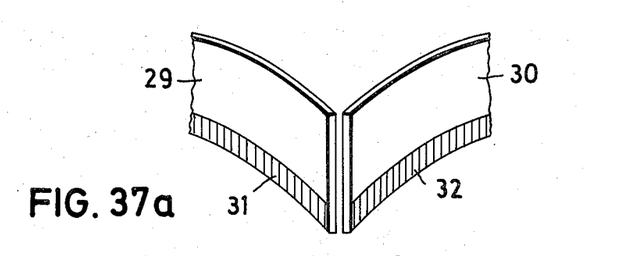
FIGS. 37a to 37e are cross-sectional views illustrating diagrammatically a sequence of steps for the production of a U-shaped profile member with a T-shaped bead, the member being formed from two strips.
Figure 37B:
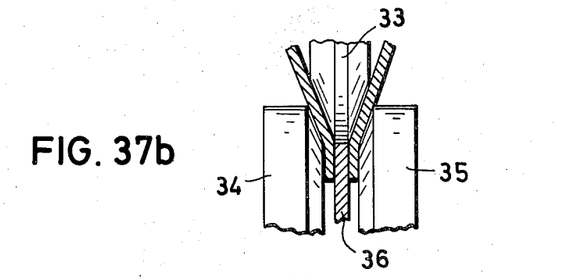
Figure 37C:
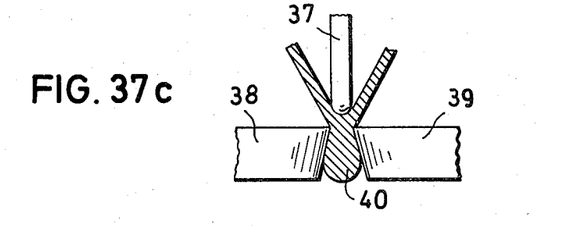

FIGS. 37a to 37e illustrate diagrammatically a sequence of steps for the production of a U-shaped profile member with a T-shaped bead at the base of the U. FIG. 37a shows in perspective how the two unformed strip components 29 and 30, heated at points 31 and 32 to welding temperature, are brought together in a curved state by guide means which are not shown in the Figure. Using the same guide means, the strip component in FIG. 37b is slightly bent off at the edge of the heating zone by the upper shaft 33 and lower shafts 34–36. In FIG. 37c a press-welding operation is effected by a roller 37 and the horizontal discs 38 and 39. A drop-like bead formation 40 is produced at the same time.

Figures 37D, 37E:
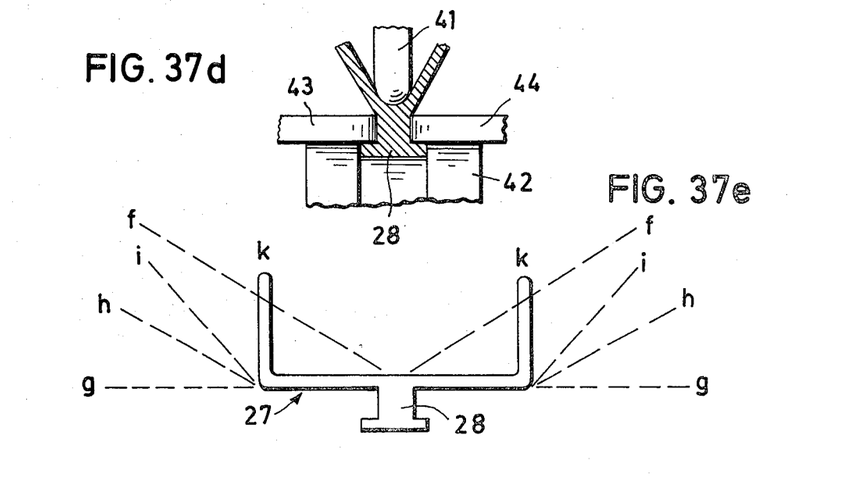
Figure 38:
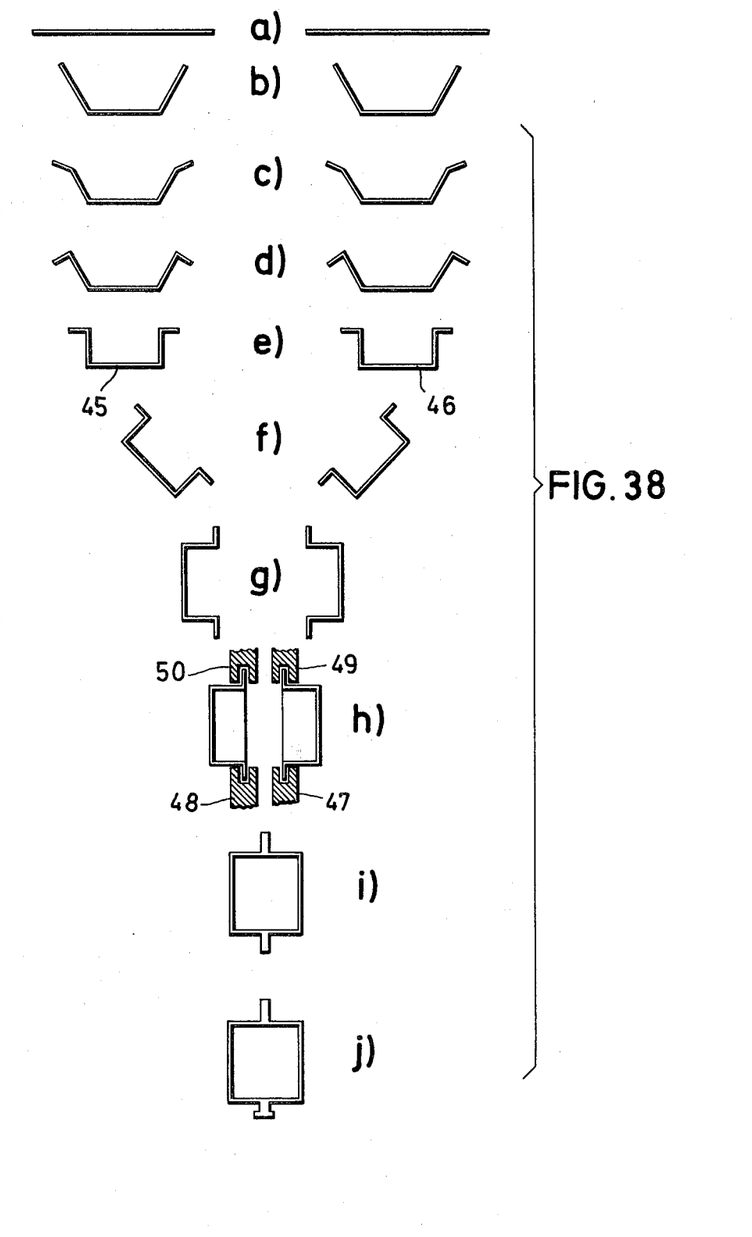
FIGS. 38a to 38j are cross-sectional views illustrating diagrammatically the various stages of production of a hollow profile stop member according to the invention.

Since the roller-gap is open, the flow of material is uninterrupted. Only at the stage illustrated in FIG. 37d does the final hot-deformation forming the T-shaped bead 28 take place in a closed groove comprising the vertically rotating rollers 41 and 42 and the horizontal discs 43 and 44. In the profile-rolling mill 23 of FIG. 34 the composite section receives its final U-shape as illustrated in FIG. 37e after undergoing the cold-deformation steps f–k which, for the sake of simplicity, are shown as broken lines.

FIGS. 38a to 38j is a simplified diagrammatic illustration of the process of manufacture of a hollow profile member corresponding to FIG. 30. The stages a to e occur in the profile-rolling mill 13 for the production of the two half-profile members 45 and 46 which in stages f and g are then rotated through 90° by guide rollers 14 and 15. At stage h heat treatment is effected by the tunnel inductors 47–50, at stage i the press-welding and preliminary hot-shaping take place and finally at stage j the final shaping of the T-shaped bead is carried out in a continuous operation.

The wide range of possible types of deformation involves variations in the disposition of the various devices in the layout of the manufacturing process. The above description is necessarily restricted to only a small number of examples. As in all deformation systems, it is recommended for reasons of economy that for particular profile groups differing in their geometry and dimensions appropriate methods of operation with suitable apparatus for each function should be used in keeping with the principles of the present invention.

While the invention has been illustrated in some detail according to the preferred embodiments shown in the accompanying drawings, and while the preferred embodiments have been described in some detail, there is no intention to thus limit the invention to such detail. It is intended to cover all modifications, alterations and equivalents falling within the spirit and scope of the attended claims.

What is claimed is:

1. A method for manufacturing profile members, hollow bodies or the like from a plurality of metal strips comprising:
   (a) providing a plurality of sources of continuous band-like metal strips, each of said band-like metal strips being of substantial width relative to its thickness and having a constant wall thickness across its entire width as viewed in cross-section and a portion of the width of each of said band-like metal strips having a flat surface;
   (b) continuously feeding said band-like metal strips along separate paths, said paths converging and being contiguous at at least one location therealong and being such that said flat surfaces of said contiguous band-like metal strips at said location are aligned;
   (c) continuously heating to a welding temperature only said portion of the width of each of said band-like metal strips;
   (d) directing the contiguous aligned heated portions of said plurality of band-like metal strips through press-welding and shaping means at said location along said path, said press-welding and shaping means contacting surfaces of said continuously moving contiguous heated portions of said band-like metal strips and compressing and press-welding said heated portions together to form a combined continuous member having an integrated portion including a bead-like formation formed from said heated portions and subsequently shaping said bead-like formation into a predetermined configuration; and
   (e) continuously altering the shape of a further portion of the width of at least one of said band-like metal strips;
   (f) whereby profile members, hollow bodies or the like are formed from an assembly of band-like metal strips and in which the press-welded portion thereof is of greater thickness than said constant wall thickness of said band-like metal strips.

2. A method according to claim 1 wherein band-like metal strips of different cross-sectional wall thicknesses are press-welded together.

3. A method according to claim 1 wherein band-like metal strips of different qualities of material are press-welded together.

4. A method according to claim 1 wherein said continuously altering the shape of said further portion of the width of at least one of said band-like metal strips comprises cold-shaping at least one of said band-like strips prior to said press-welding.

5. A method according to claim 1 wherein said continuously altering the shape of a further portion of the width of at least one of said band-like metal strips comprises cold-shaping said assembly of band-like metal strips following said press-welding and hot-shaping.

6. A method according to claim 1 wherein deformation operations are carried out substantially at right angles to the direction of movement of at least one of said band-like metal strips in conjunction with said hot-shaping to apply superficial structures, stampings, bosses and the like.

7. A method according to claim 1 comprising urging flow of material in said assembly of band-like metal strips in a direction transverse to the direction of movement of said band-like metal strips to assist in said hot-shaping operation.

8. A method according to claim 1 wherein said assembly of band-like metal strips which has been deformed during said hot-shaping procedure is cooled to a temperature above room temperature but outside the blue shortness range relevant to the particular material of said band-like metal strips.

9. A method according to claim 1 wherein at least one of said band-like metal strips is moved into a plane which is not parallel to the plane of another of said band-like metal strips prior to said press-welding.

10. A method according to claim 1 wherein said band-like metal strips are brought together by at least one pair of guide rollers adapted to effect deformation of said band-like metal strips therebetween.

11. A method according to claim 1 wherein said portions of said band-like metal strips are heated by medium-frequency induction.

12. A method according to claim 11 wherein said heating is carried out by linear conductors located adjacent opposite surfaces of said band-like metal strips.

13. A method according to claim 11 wherein at least one edge of each of said band-like metal strips is heated by a tunnel inductor enclosing said edges.

14. A method according to claim 11 wherein oxygen is projected on said band-like metal strips during said heating step.

15. A method according to claim 11 wherein said heating, press-welding and hot-shaping are carried out in a protective gas insulating said band-like metal strips from the atmosphere.

16. A method according to claim 1 wherein each of said band-like metal strips has at least two portions of the width thereof having flat surfaces, said paths being arranged such that corresponding flat surfaces of said contiguous band-like strips are aligned at said location and are press-welded together to form a continuous hollow body.

17. A method according to claim 16 comprising hot-shaping said press-welded portion of said assembly to modify the cross-sectional shape of said press-welded portion.

18. A method according to claim 1 wherein said press-welding and shaping means comprises a plurality of rollers arranged with their peripheral surfaces in spaced relationship such that said peripheral surfaces contact said surfaces of said contiguous portions continuously passing therebetween and compress and press-weld said heated portions together to form said integrated portion and shape the exterior surface of said integrated press-welded portion into a predetermined configuration.

19. Apparatus for the manufacture of profile members, hollow bodies or the like from a plurality of band-like metal strips, each of said band-like metal strips being of substantial width relative to its thickness and having a constant wall thickness across its entire width as viewed in cross-section and a portion of the width of each of said band-like metal strips having a flat surface, comprising:
   (a) means for continuously feeding without interruption said plurality of continuous band-like metal strips along separate paths, said paths converging and being contiguous at at least one location therealong and being such that said flat surfaces of said contiguous band-like metal strips at said location are aligned;
   (b) means along each of said paths for continuously heating to a welding temperature only said portion of the width of each of said band-like metal strips;
   (c) press-welding means at said location along said path downstream of said heating means arranged to contact surfaces of said continuously moving contiguous heated portions of said band-like metal strips and compress and press-weld said heated portions together to form a combined continuous member having an integrated portion including a bead-like formation and shaping means downstream of said press-welding means to shape said bead-like formation into a predetermined configuration; and
   (d) means along at least one of said paths for continuously altering the shape of a further portion of the width of at least one of said band-like metal strips;
   (e) whereby profile members, hollow bodies or the like may be formed from an assembly of band-like metal strips and in which the press-welded portion thereof is of greater thickness than said constant wall thickness of said band-like metal strips.

20. Apparatus according to claim 19 further comprising at least one of the following additional components arranged along at least one of said paths;
   (a) means for straightening said band-like metal strips;
   (b) means for shearing and transversely welding said band-like metal strips to join lengths of said band-like metal strips together;
   (c) means for storing said band-like metal strips;
   (d) means for cooling the assembly of band-like metal strips downstream of said press-welding means;
   (e) means for cold-shaping said assembly of band-like metal strips; and
   (f) means for shearing said assembly of band-like metal strips into predetermined lengths.

21. Apparatus according to claim 19 further comprising means for cold-shaping said assembly of band-like strips, each comprising a profile rolling mill, each of said mills including drive means to convey said band-like metal strips along said respective paths.

22. Apparatus according to claim 19 comprising means for cold-shaping said assembly of band-like metal strips, said cold-shaping means comprising a straightening machine.

23. Apparatus according to claim 19 further comprising means for cold-shaping said assembly of band-like metal strips, said cold-shaping means comprising a wind-in reel.

24. Apparatus according to claim 22 further comprising cooling means downstream of said cold-shaping means.

25. Apparatus according to claim 19 wherein said press-welding means and said shaping means together comprise a plurality of rollers arranged with their peripheral surfaces in spaced relationship such that said peripheral surfaces contact said surfaces of said contiguous heated portions continuously passing therebetween and compress and press-weld said heated portions together to form said integrated portion and shape the exterior surface of said integrated press-welded portion into a predetermined configuration.

26. A method for manufacturing profile members, hollow bodies or the like from a plurality of metal strips comprising:
   (a) providing a plurality of sources of continuous band-like metal strips, each of said metal strips being of substantial width relative to its thickness;
   (b) continuously feeding without interruption said plurality of continuous metal strips along respective paths, at least the downstream portions of said paths forming a consolidated single path;
   (c) continuously heating to a welding temperature at least one portion of the width of each of said metal strips such that surfaces of said heated at least one portion of said metal strips are in contiguous relationship while passing along said consolidated single path; and
   (d) passing the contiguous heated portions of said metal strips through press-welding and shaping means along said consolidated single path, said press-welding and shaping means contacting surfaces of said continuously moving heated portions of said metal strips and compressing and press-welding said heated portions together to form a combined continuous member having at least one integrated portion including a bead-like formation and subsequently shaping the at least one bead-like formation into a predetermined configuration;

(e) whereby profile members, hollow bodies or the like are formed from an assembly of band-like metal strips.

27. A method according to claim 26 comprising the further step of continuously altering the shape of a further portion of the combined continuous member.

28. A method according to claim 26 comprising the further step of continuously altering the shape of a further portion of the width of at least one of said band-like metal strips.

29. A method according to claim 26 wherein said band-like metal strips each have a constant wall thickness across its entire width as viewed in cross-section.

30. A method according to claim 26 wherein said surfaces of said heated portions of said metal strips in contiguous relationship are flat surfaces.

31. A method according to claim 26 wherein said heating step comprises heating to a welding temperature a portion of the width of each of said metal strips adjacent at least one edge thereof, said compressing and press-welding step comprises forming a combined continuous member having an integrated portion including said bead-like formation at at least one edge of said combined continuous member, and said shaping step comprises shaping the bead-like formation into a predetermined configuration at at least one edge of said combined continuous member.

32. Apparatus for the manufacture of profile members, hollow bodies or the like from a plurality of band-like metal strips, each of said metal strips being of substantial width relative to its thickness;

(a) means for continuously feeding without interruption a plurality of continuous metal strips along respective paths, at least the downstream portions of said path forming a consolidated single path;

(b) means along each of said paths for continuously heating to a welding temperature at least one portion of the width of each of said metal strips such that surfaces of said heated at least one portion of said metal strips are in contiguous relationship while passing along said consolidated single path; and (c) press-welding means along said consolidated single path adapted for contacting surfaces of said continuously moving heated portions of said metal strips and compressing and press-welding said at least one heated portion of said metal strips together to form a combined continuous member having at least one intergrated portion including a bead-like formation and shaping means downstream of said press-welding means for shaping the at least one bead-like formation into a predetermined configuration;

(d) whereby profile members, hollow bodies or the like may be formed from an assembly of band-like metal strips.

33. Apparatus according to claim 32 further comprising means for continuously altering the shape of a further portion of said combined continuous member.

34. Apparatus according to claim 32 further comprising means for continuously altering the shape of a further portion of the width of at least one of said band-like metal strips.

35. Apparatus according to claim 32 wherein said heating means is adapted to continuously heat to a welding temperature a portion of the width of each of said metal strips adjacent at least one edge thereof, and press-welding means is adapted to form a combined continuous member having an integrated portion including said bead-like formation at at least one edge of said combined continuous member, and said shaping means is adapted to shape the bead-like formation into a predetermined configuration at at least one edge of said combined continuous member.

* * * * *